(12) United States Patent
Niu et al.

(10) Patent No.: US 12,358,079 B1
(45) Date of Patent: Jul. 15, 2025

(54) INDUCTOR COIL WELDING EQUIPMENT AND ITS WELDING PROCESS

(71) Applicant: BTCOIL ELECTRONICS (DONGGUAN) LIMITED, Guangdong (CN)

(72) Inventors: Junkai Niu, Guangdong (CN); Tao Zhu, Guangdong (CN); Liyong Tian, Guangdong (CN); Yonghao Yao, Guangdong (CN); Mingquan Lin, Guangdong (CN)

(73) Assignee: BTCOIL ELECTRONICS (DONGGUAN) LIMITED, Guangdong (CN)

( * ) Notice: Subject to any disclaimer, the term of this patent is extended or adjusted under 35 U.S.C. 154(b) by 0 days.

(21) Appl. No.: 19/008,821

(22) Filed: Jan. 3, 2025

(30) Foreign Application Priority Data

Nov. 12, 2024 (CN) .......................... 202411613610.9

(51) Int. Cl.
*B23K 31/02* (2006.01)
*B23K 20/12* (2006.01)
*B23K 26/03* (2006.01)
*B23K 26/142* (2014.01)
*B23K 26/21* (2014.01)
*B23K 28/02* (2014.01)
(Continued)

(52) U.S. Cl.
CPC .............. *B23K 28/02* (2013.01); *B23K 20/12* (2013.01); *B23K 26/032* (2013.01); *B23K 26/142* (2015.10); *B23K 26/21* (2015.10); *B23K 37/0435* (2013.01); *B23K 2101/38* (2018.08)

(58) Field of Classification Search
CPC ............ B23K 2101/38; B23K 37/0435; B23K 26/032; B23K 20/12; B23K 26/21; B23K 26/142; B23K 28/02
USPC ....................................................... 219/121.6
See application file for complete search history.

(56) References Cited

U.S. PATENT DOCUMENTS

| 2013/0214744 A1* | 8/2013 | Kang | ...................... H02J 50/10 320/162 |
| 2015/0083710 A1* | 3/2015 | Albrecht | ................ B23K 9/167 219/601 |

(Continued)

FOREIGN PATENT DOCUMENTS

| CN | 105171262 A | * 12/2015 | ............. B23K 28/02 |
| CN | 210081276 U | * 2/2020 | |

(Continued)

OTHER PUBLICATIONS

First Office Action received in corresponding Chinese patent application No. 202411613610.9, dated Feb. 26, 2025, 24 pages.

*Primary Examiner* — Jimmy Chou
(74) *Attorney, Agent, or Firm* — Cooper Legal Group, LLC

(57) ABSTRACT

An inductor coil welding equipment includes a feeding system, a solid-state welding device, and a laser welding device. The laser welding device is installed behind the solid-state welding device, and the feeding system is used to sequentially send the inductor coil and the conductive plates to the solid-state welding device and the laser welding device. The solid-state welding device is used to pre-weld and fix the inductor coil to the conductive plates, forming a welded inductance conductive plate. Laser welding is used for performing enhancement welding at a welding joint between the inductor coil and the conductive plate.

5 Claims, 14 Drawing Sheets

(51) Int. Cl.
*B23K 37/04* (2006.01)
*B23K 101/38* (2006.01)

(56) References Cited

U.S. PATENT DOCUMENTS

2015/0351581 A1* 12/2015 Li ............................. A23F 5/26
  700/275
2016/0105935 A1* 4/2016 Jones .................... B23K 10/00
  219/601

FOREIGN PATENT DOCUMENTS

| | | | |
|---|---|---|---|
| CN | 114559156 A | | 5/2022 |
| CN | 216849652 U | | 6/2022 |
| CN | 218638806 U | | 3/2023 |
| CN | 220127830 U | * | 12/2023 |
| CN | 118748123 A | * | 10/2024 |
| JP | 2002261365 A | | 9/2002 |
| KR | 200256492 Y1 | | 12/2001 |

* cited by examiner

INDUCTOR COIL WELDING EQUIPMENT AND ITS WELDING PROCESS

CROSS-REFERENCE TO RELATED APPLICATION

The present application is based on and claims the priority benefits of China application No. 202411613610.9, filed on Nov. 12, 2024. The entirety of China application No. 202411613610.9 is hereby incorporated by reference herein and made a part of this specification.

TECHNICAL FIELD

The present application relates to the field of welding equipment, and, more particularly, to an inductor coil welding equipment and its welding process.

BACKGROUND ART

An inductor is widely used in electronic devices. With the development of electronic products towards smaller, lighter, and more integrated products, higher requirements have been put forward for the production of inductors.

At present, the production of inductor coils mainly adopts solid-state welding or laser welding technology. Solid-state welding has significant advantages of fast welding speed and high efficiency. However, solid-state welding suffers from some difficulties in welding quality inspection, since it does not require strict contact between two welding surfaces. Welding can be achieved as long as two surface approach each other, which, however, may lead to welding defects such as excessive heat generation and metal deformation at the welding site. Laser welding has attracted much attention for its characteristics such as high precision, high quality, and small heat affected zone, but it also faces challenges, including high equipment cost and high-tech operation requirement. Especially, small pin diameter of an inductor coil imposes extremely high requirement for alignment accuracy, since even a slight deviation may cause the welding surface to fail to contact with each other.

In spite of high efficiency of solid-state welding, it suffers from shortcomings in welding quality and joint strength, as well as a risk of welding defects such as metal deformation caused by high temperatures. Laser welding can achieve superior welding quality, but it has high equipment cost, high technical barrier, and a certain possibility of welding defects. In addition, there are extremely high requirements for alignment accuracy of inductance coil pins, which increases the difficulty in operation.

SUMMARY

In order to improve the welding quality and reliability of inductor coils, the present application provides an inductor coil welding equipment and its welding process.

The inductor coil welding equipment disclosed in the present application includes a feeding system, a solid-state welding device, and a laser welding device. The laser welding device is located behind the solid-state welding device, and the feeding system is used to sequentially send the inductor coil and the conductive plate to the solid-state welding device and the laser welding device. The solid-state welding device is used to pre-weld and fix the inductor coil to the conductive plate, forming a welded inductance conductive plate. The laser welding is used for performing enhancement welding at a welding joint between the inductor coil and the conductive plate.

Solid-state welding in related technologies may have welding defects, such as high heat generation and easy deformation of the metal at the welding point. The prerequisite for laser welding to achieve welding is that the two welding surfaces have to be in contact with each other. Due to the very small pin diameter of the inductor coil, the requirement for alignment accuracy is particularly high. If there is a slight deviation in position, the two welding surfaces cannot be in contact with each other. The present application realizes an integrated fully automatic processing flow from wire feeding to obtaining the final product, improving production efficiency and ensuring product quality. By combining the advantages of solid-state welding for initial welding and laser welding for secondary welding, the potential welding defects of solid-state welding are overcome, while the high-precision and high-quality advantages of laser welding are fully utilized. Solid-state welding ensures that welding can be achieved even with slight position deviations, while laser welding further improves the accuracy and quality of welding, achieving high-quality welding of inductor coils.

The present application accurately transports the conductive plate to the working area of the solid-state welding mechanism through a handling mechanism. Subsequently, the pressing mechanism is activated to fix the conductive plate and inductor coil, ensuring their relative stability during the welding process and preventing welding defects caused by movement or misalignment. Next, the solid-state welding mechanism uses resistance heating to pre-weld and fix two pins of the inductor coil to corresponding positions on the conductive plate, completing the welding process.

The technical solution of the present application also achieves precise clamping and welding of inductor coil pins, ensuring stable connection through solid-state welding even with slight position deviations, providing a reliable foundation for high-precision processing of subsequent laser welding.

The technical solution of the present application realizes the automatic transportation and precise positioning of the conductive plate, and uses the first pin to firmly clamp the conductive plate, improving the automation level and positioning accuracy of the inductor coil welding process, thereby enhancing the overall welding efficiency and product quality.

Due to a cooperation between the pressing cylinder and the pressing plate in the present application, the conductive plate can be effectively fixed before welding, preventing it from shifting or running during the welding process, thereby ensuring the stable and accurate welding position between the inductor coil and the conductive plate, further improving the welding quality and product consistency.

The present application uses a second mounting base to stably support the entire device. The first lifting drive mechanism drives the second lifting seat and its laser welding mechanism to adjust lifting and lowering, ensuring that the laser welding mechanism is maintained at the optimal welding position and angle relative to the workpiece, thereby achieving precise and efficient laser welding operations. At the same time, safety protection, parameter adjustment, and maintenance measures are taken to ensure welding quality and stable equipment operation.

According to the technical solution of the present application, during the laser welding process, the galvanometer component precisely adjusts the direction and angle of the laser beam based on the position information of the inductance conductive plate provided by the visual inspection mechanism, ensuring that the laser beam can accurately irradiate the welding site of the inductance conductive plate. At the same time, the field lens focuses the laser beam to concentrate its energy, thereby achieving efficient and precise welding.

The sliding drive mechanism of the present application can adjust the positions of the paint stripping mechanism and the suction mechanism in the horizontal direction. The paint stripping device can move flexibly in the horizontal direction, accurately strip the wire, effectively remove the insulation layer on the surface of the wire, and the suction mechanism collects the waste generated during the stripping process, keeping the working environment clean and improving the efficiency and quality of wire processing.

The winding device of the present application can efficiently wind the stripped wire into the shape of an inductor coil, and automatically cut off the wire after winding is completed, while further bending the pins of the inductor coil, improving production efficiency and coil forming quality.

The upper mold mechanism of the present application achieves lifting adjustment through the first lifting driver, and cooperates with the rotation driving assembly to drive the spindle component to rotate, so that the wire can be precisely wound into the shape of an inductor coil. The clamping member automatically clamps the wire, improving winding efficiency and accuracy. The lifting function of the spindle component helps to ensure stability and quality control during the coil forming process.

The lower mold mechanism of the present application can effectively support the wire and form the shape of the inductor coil, while ensuring that the axis of the lower mold core coincides with that of the spindle component, thereby improving the accuracy for winding the inductor coil. The hollow structure design facilitates smooth introduction and removal of wires, and an opening end facilitates replacement and maintenance of the lower mold core, improving the efficiency and quality of the entire winding process.

The feeding device of the present application achieves precise transportation of the inductor coil in the first and second directions through the cooperation of a longitudinal driving mechanism and a transverse driving mechanism, and drives the material receiving mechanism to lift and lower through a lifting driving mechanism, so that the inductor coil can be accurately positioned under the conductive plate. At the same time, the pushing mechanism can push one pin of the inductor coil to the fixed side to ensure the accuracy of the pin position, thereby improving the transportation accuracy and reliability of the inductor coil.

The pin cutting device of the present application can achieve precise cutting of the pins of the inductor coil, and provide effective buffering and precise control during the pin cutting process, thereby ensuring the stability and cutting accuracy of the pin cutting action.

The present application further provides a welding process using an inductor coil welding equipment, including:

S1: unwinding a wire by the unwinding device;

S2: performing stripping treatment to the wire by using the paint stripping device to remove an insulation layer on the wire;

S3: winding stripped wire at a set distance by the winding device into the shape of an inductor coil and cutting the wire by the cutting mechanism, while bending pins of the inductor coil by the bending mechanism;

S4: winding and transporting the conductive plate by the conductive plate feeding device to a predetermined position;

S5: receiving and transferring the inductor coil by the material receiving device to the solid-state welding station, and precisely transferring the inductor coil to a position below the conductive plate;

S6: visually inspecting the position of the inductor coil to ensure that the inductor coil is connected to a bottom of the conductive plate:

S7: welding two pins of the inductor coil by the solid-state welding device onto the conductive plate to form a welded inductance conductive plate;

S8: performing a secondary welding on the welded inductance conductive plate by the laser welding device;

S9: cutting off excessive pins of the inductor coil with the pin cutting device, and transferring the welded inductance conductive plate to a visual inspection station;

S10: detecting a size of the inductor coil by a detection device, wherein, when the size is determined to be OK, the method directly proceeds to a next step; and, when the size is judged as NG, a marking device 9 marks unqualified welding inductance conductive plates with dots;

S11: when the size is judged as NG, drilling holes or make other markings on the welded inductance conductive plates marked with dots, facilitating subsequent differentiation and processing; and S12: winding the welded inductance conductive plates by the winding device, and collectively collecting qualified products and marked unqualified products By adopting the above technical solution, the insulation layer is removed by stripping the wire at a set distance, which facilitates subsequent welding; Then, the wire is wound into an inductor coil and the structural stability is increased by bending. Then the visual system is used for accurate positioning to ensure the accurate connection of the inductor coil and reduce quality problems caused by misalignment. Subsequently, an initial welding is carried out through solid-state welding, and a secondary welding is carried out through laser welding to enhance the welding strength and reliability. Finally, the product size consistency is ensured through pin cutting and visual inspection, and unqualified products are distinguished by marking with dots, greatly improving production efficiency and qualification rate.

DETAILED DESCRIPTION

The following provides a detailed explanation of the present application in conjunction with FIGS. 1-14.

In this embodiment, a direction for transporting a conductive plate is defined as a first direction, and a width direction of a chassis is defined as a second direction.

Embodiment 1

Figure 1:
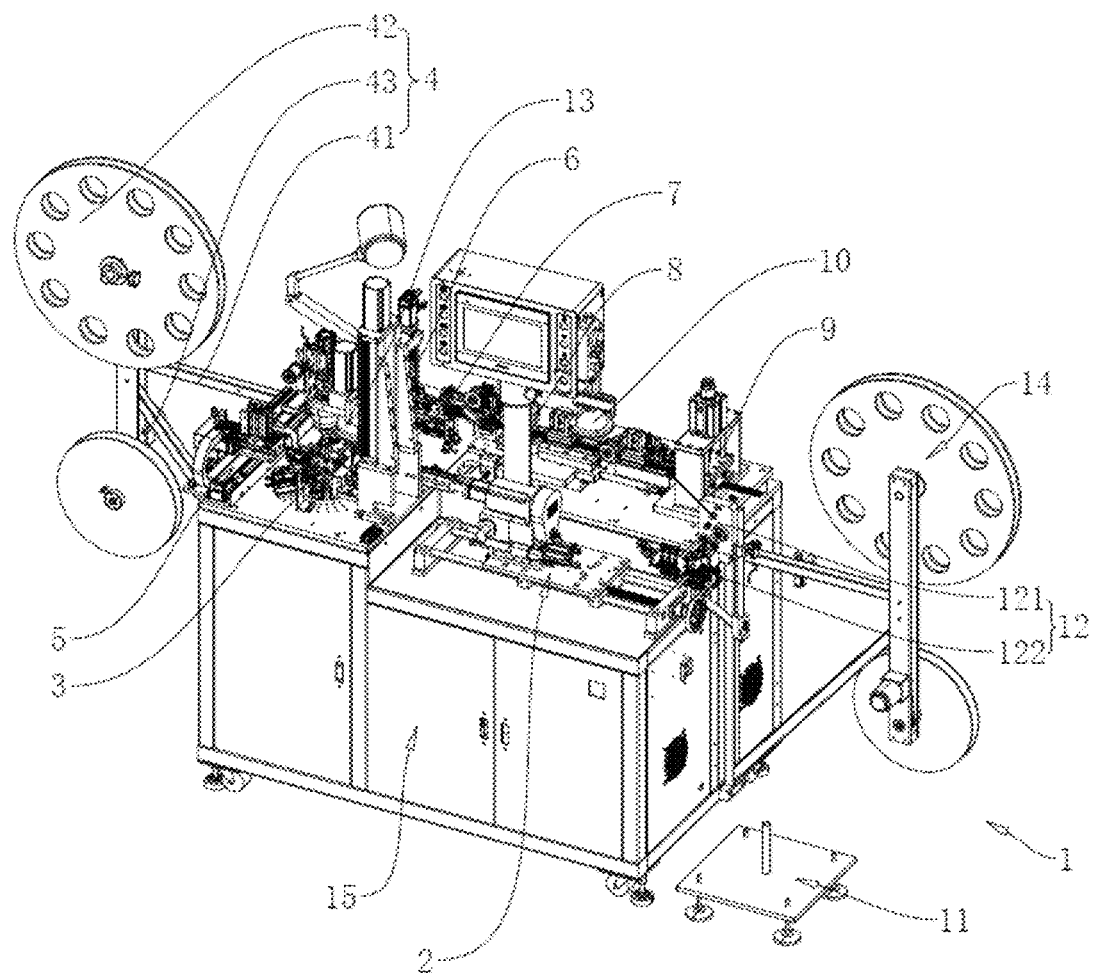
FIG. 1 is a schematic diagram of an inductor coil welding equipment of the present application.

The present embodiment provides an inductor coil welding equipment, as shown in FIG. 1, including a chassis 15. One side of the chassis 15 is provided with a unwinding device 1, and the chassis 15 is sequentially provided with a paint stripping device 2, a winding device 3, a conductive plate feeding device 4, a material receiving device 5, a solid-state welding device 6 (for example, a resistance welding device), a laser welding device 7, a pin cutting device 8, a detection device 10, a marking device 9, and a winding device 14.

Referring to FIG. 1, the unwinding device 1 includes a unwinding mechanism 11 for installing a spool and a wire arrangement mechanism 12. The wire arrangement mechanism 12 includes a tensioner 121 and a wire arrangement device 122. The tensioner 121 can monitor the tension state of a wire in real time, and the wire arrangement device 122 includes multiple guide wheels for unwinding the wire by a predetermined path.

Figure 2:
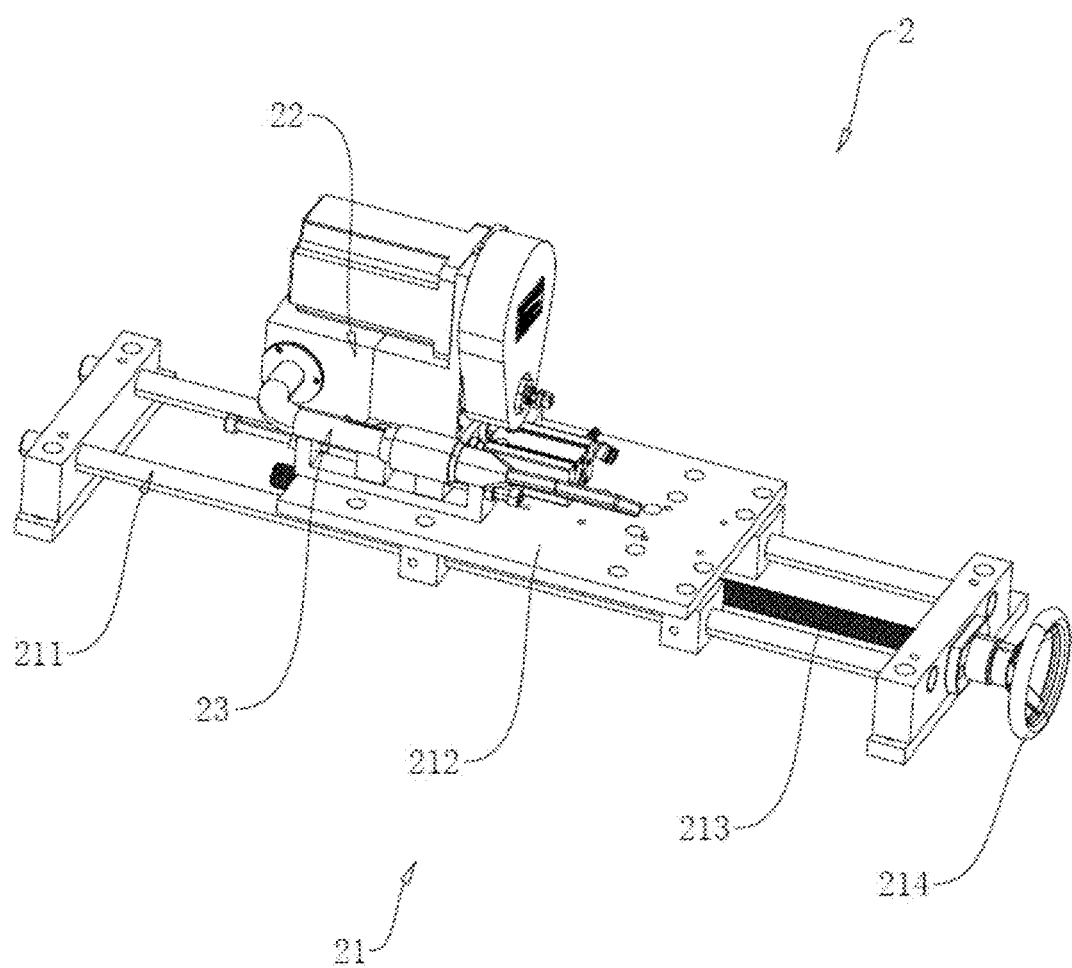
FIG. 2 is a schematic diagram of a paint stripping device in the present application.

Referring to FIGS. 1 and 2, the paint stripping device 2 includes a sliding mechanism 21, a paint stripping mechanism 22, and a suction mechanism 23. The sliding mechanism 21 includes a first support seat 211, a sliding seat 212, a screw 213, and a handwheel 214. The first support seat 211 is fixed onto the chassis 15, and the sliding seat 212 is in sliding cooperation with the first support seat 211. The paint stripping mechanism 22 is provided on the sliding seat 212. The screw 213 extends in the first direction, with an end rotatably connected to the first support seat 211. The handwheel 214 is fixed to the screw 213. Specifically, the paint stripping mechanism 22 is a three-jaw pneumatic stripping machine. The suction mechanism 23 is installed on the paint stripping mechanism 22, used to suction waste materials from the paint stripping mechanism 22.

Figure 3:
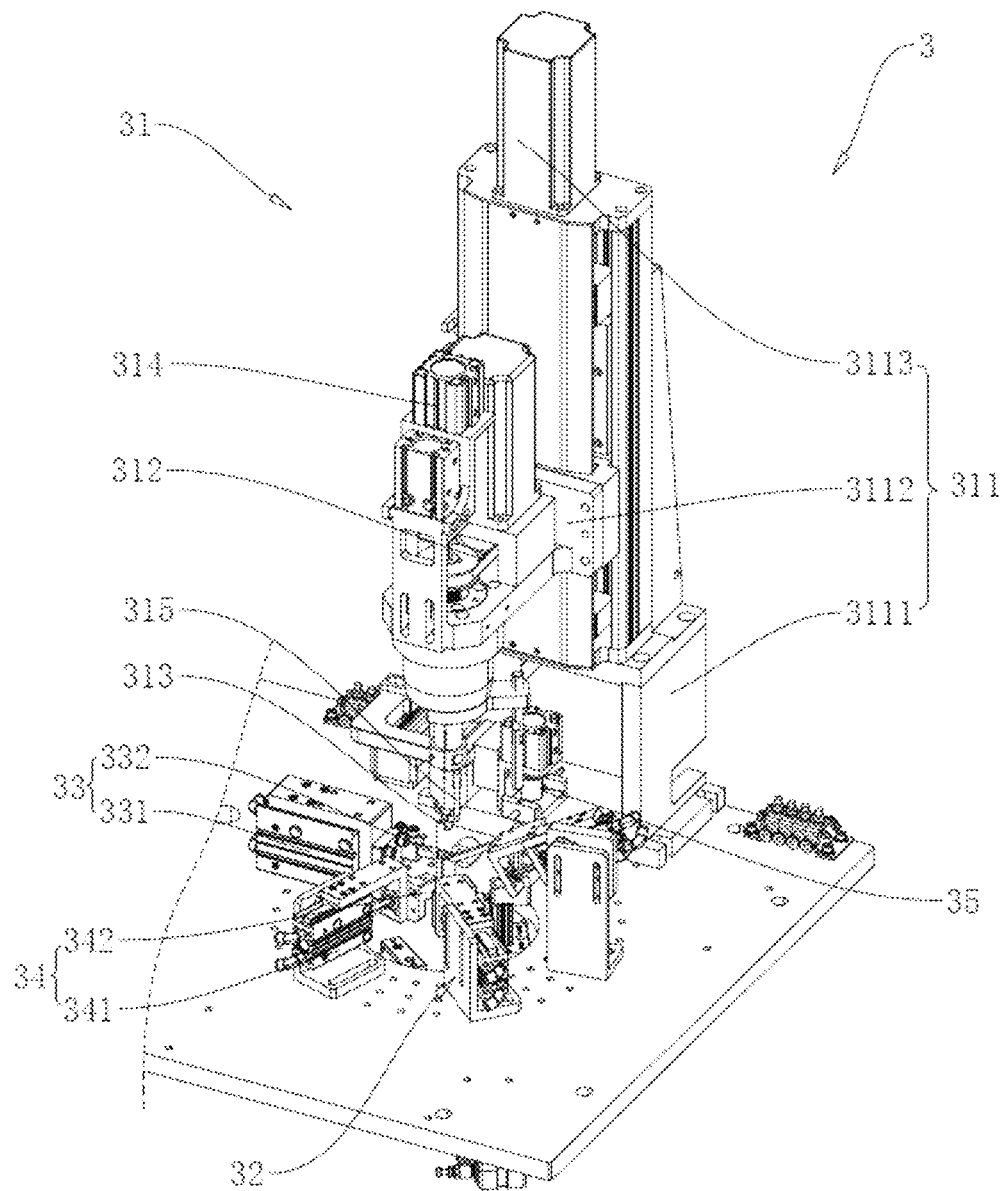
FIG. 3 is a schematic diagram of a winding device of the present application.
Figure 4:
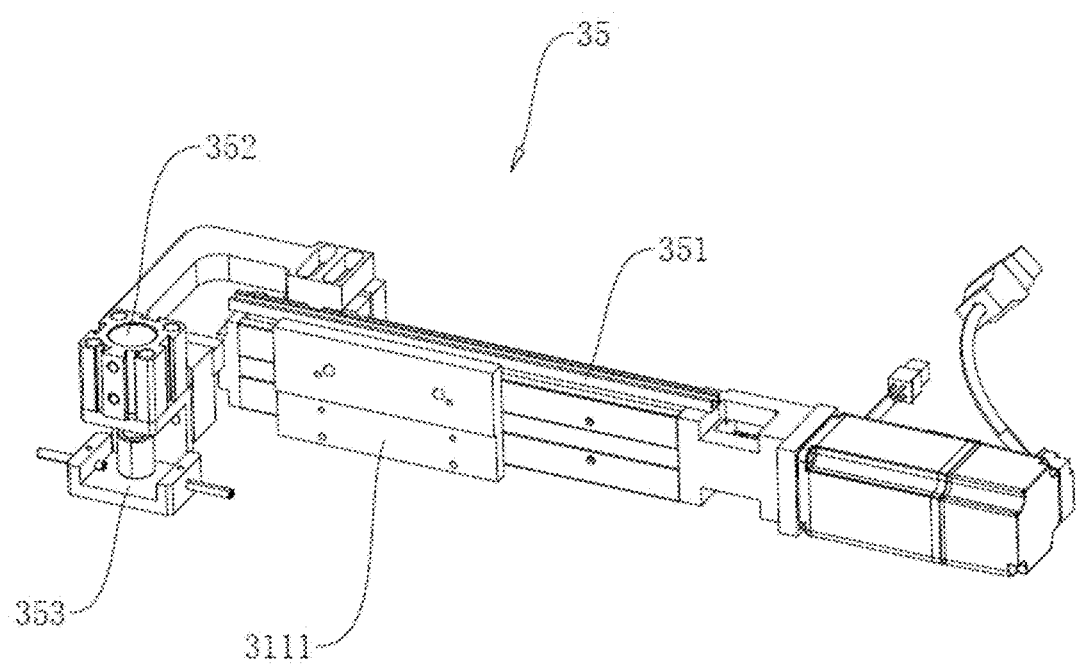
FIG. 4 is a schematic diagram of a guiding mechanism of the present application.

Referring to FIGS. 3 and 4, the winding device 3 includes an upper mold mechanism 31, a lower mold mechanism 32, a cutting mechanism 33, and a bending mechanism 34. The upper mold mechanism 31 includes a first lifting assembly 311, a rotation driving assembly 312, a spindle component 313, a core pulling driver 314, and a second clamping member 315. The first lifting assembly 311 includes a first support seat 3111, a third lifting seat 3112, and a first lifting driver 3113. The first support seat 3111 is fixed to the chassis 15, and the third lifting seat 3112 is in sliding cooperation with the first support seat 3111. The first lifting driver 3113 is provided on the first support seat 3111, used to lift or lower the third lifting seat 3112. The spindle component 313 is rotatably connected to the third lifting seat 3112, and the rotation driving assembly 312 is provided on the third lifting seat 3112 to drive the spindle component 313 to rotate. The core pulling driver 314 is installed on the third lifting seat 3112, used to lift and lower the spindle component 313. The second clamping member 315 is provided on the third lifting seat 3112, used for automatic clamping of wires.

Referring to FIGS. 3 and 4, the first support seat 3111 is provided with a guide mechanism 35, which includes a horizontal driver 351, a fifth lifting component 352, and a conductive plate component 353. The horizontal driver 351 is installed on the third lifting seat 3112 to drive the fifth lifting component 352 to move in the first direction. The fifth lifting component 352 is used to drive the lifting of the conductive plate component 353, and the conductive plate component 353 is provided with a guide hole for wires to pass through.

Figure 5:
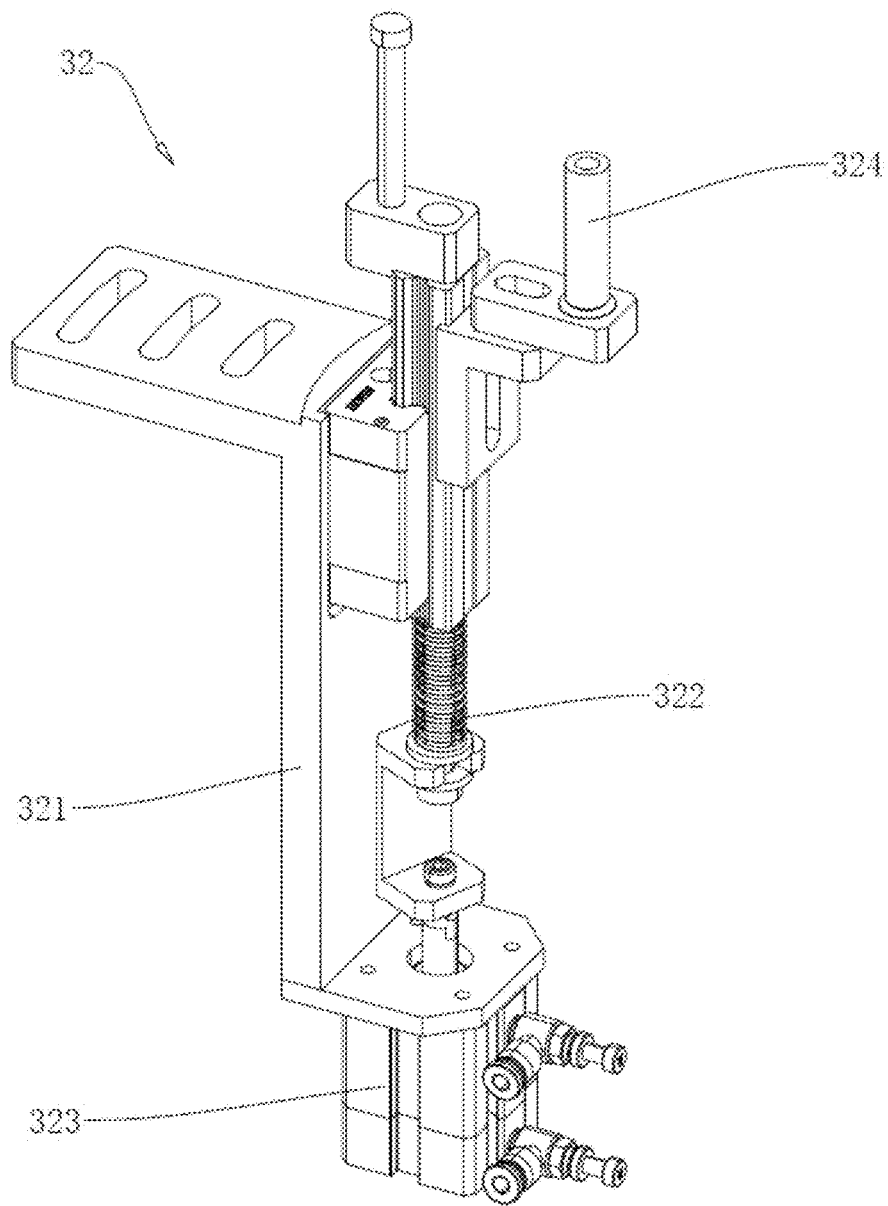
FIG. 5 is a schematic diagram of a lower mold mechanism of the present application.

Referring to FIGS. 1, 4, and 5, the lower mold mechanism 32 includes a second support 321, a buffer component 322, a second lifting component 323, and a hollow lower mold core 324. The second support 321 is fixed inside the chassis 15, and the buffer component 322 and the second lifting component 323 are provided on the second support 321. The second lifting component 323 is used to lift and lower the buffer component 322. The lower mold core 324 is provided on the buffer component 322 and located below the spindle component 313, and the axis of the lower mold core 324 coincides with the axis of the spindle component 313.

Referring to FIG. 3, the cutting mechanism 33 includes a third cylinder 331 and a cutting blade 332. The third cylinder 331 is fixed to the second support 321 on the chassis 15, and a piston rod of the third cylinder 331 is fixedly connected to the cutting blade 332 for cutting copper wire.

There are two bending mechanisms 34, each of which includes a fourth cylinder 341 and a bending block 342. The fourth cylinder 341 is provided on the chassis 15, and a piston rod of the fourth cylinder 341 is fixedly connected to the bending block 342. The bending mechanism 34 is used to further bend an inductor coil.

Figure 6:
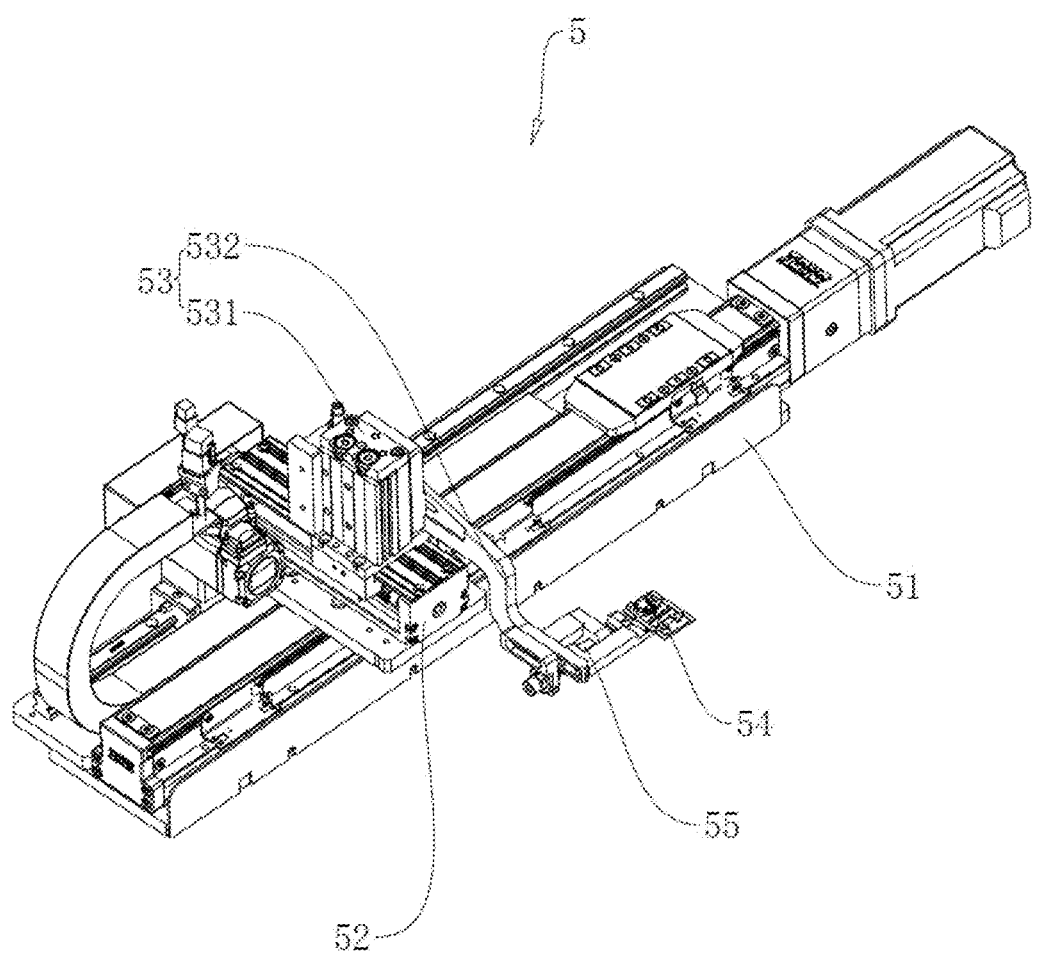
FIG. 6 is a schematic diagram of a material receiving device of the present application.

Referring to FIGS. 1 and 6, the material receiving device 5 includes a transverse driving mechanism 51, a longitudinal driving mechanism 52, a second lifting driving mechanism 53, a material receiving mechanism 54, and a pin pushing mechanism 55. The transverse driving mechanism 51 is provided at one end of the chassis 15, used to drive the longitudinal driving mechanism 52 to move in the second direction, while the longitudinal driving mechanism 52 is used to drive the second lifting driving mechanism 53 to move in the first direction. The second lifting drive mechanism 53 is used to lift and lower the material receiving mechanism 54, and the material receiving mechanism 54 is provided with a positioning slot for receiving the inductor coil. The pin pushing mechanism 55 is provided on the material receiving mechanism 54, used to push the pins of the inductor coil towards a fixed side.

Referring to FIG. 6, the second lifting driving mechanism 53 includes a lifting frame 532 and a fourth lifting component 531 arranged on the longitudinal driving mechanism 52. The fourth lifting component 531 is used to lift and lower the lifting frame 532.

Referring to FIG. 1, the conductive plate feeding device 4 includes a support frame 41, a rotation driving mechanism 43, and two turntables 42. The support frame 41 is fixed to the end of the chassis 15, and both of the turntables 42 are rotatably connected to the support frame 41. The rotation driving mechanism 43 is mounted on the support frame 41, used to simultaneously drive the rotation of two turntables 42.

Figure 7:
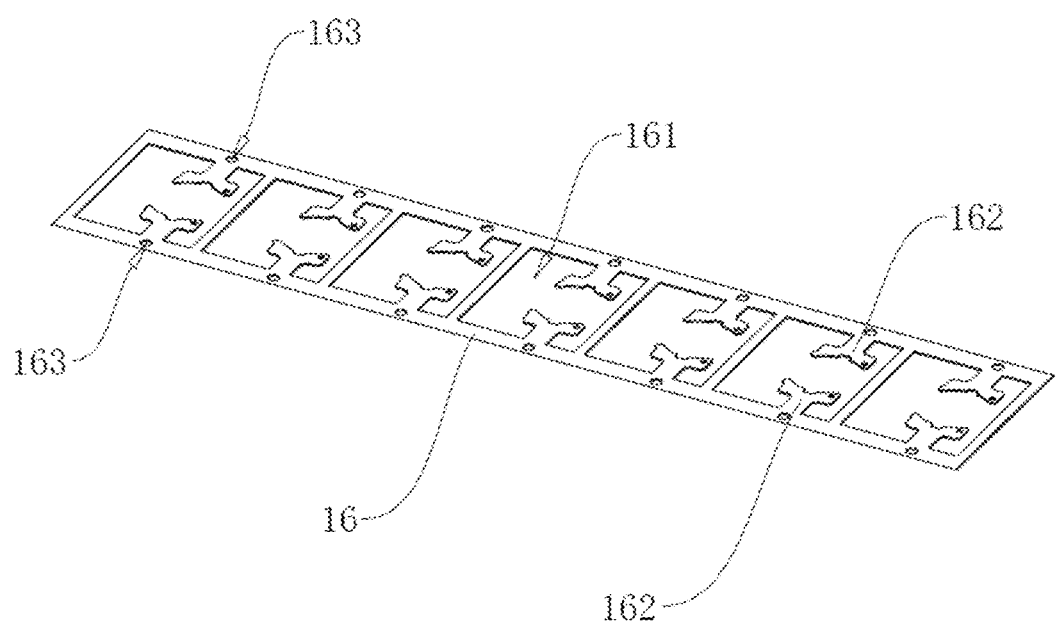
FIG. 7 is a schematic diagram of a conductive plate of the present application.

Referring to FIG. 7, the conductive plate 16 is provided with multiple through slots 161 along its own length direction, and a connecting portion 162 for connecting pins is integrally formed at both sides of each of the through slot 161.

Figure 8:
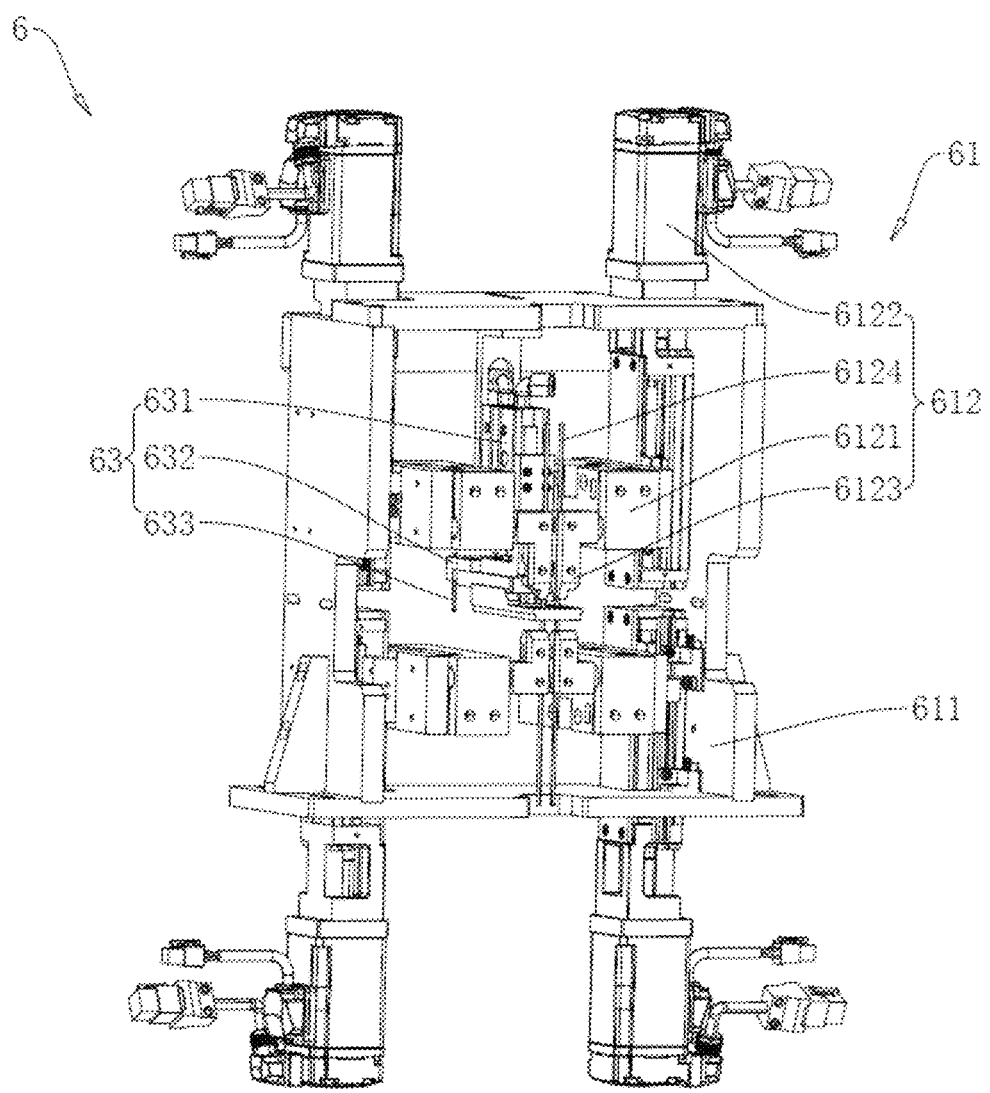
FIG. 8 is a schematic diagram of a solid-state welding mechanism of the present application.
Figure 9:
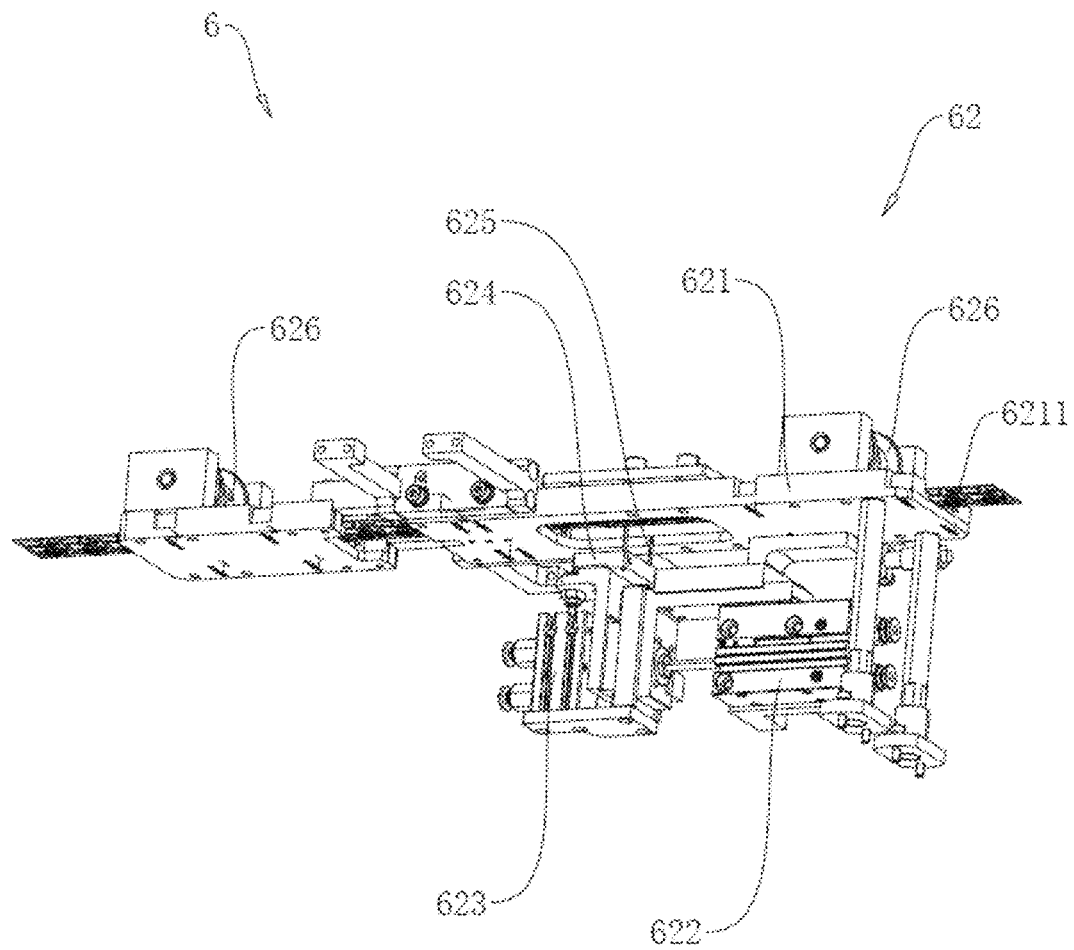
FIG. 9 is a schematic diagram of a handling mechanism of the present application.

Referring to FIGS. 8 and 9, the solid-state welding device 6 can specifically implement resistance welding, friction welding, diffusion welding, and pressure welding. In this embodiment, the solid-state welding device 6 includes a solid-state welding mechanism 61 and a handling mechanism 62. The solid-state welding mechanism 61 includes a first base 611 and four symmetrical welding components 612, each of the welding components 612 including a welding lifting member 6121, a second lifting driver 6122, a first clamping member 6123, and a welding needle 6124. The welding lifting member 6121 is in sliding cooperation with the first base 611. The first lifting driver 3113 is installed on the first base 611 to lift and lower the welding lifting member 6121. The first clamping member 6123 is provided on the welding lifting member 6121, used to clamp the welding needle 6124, which is used to weld the two pins of the inductor coil to the corresponding two connecting portions 162.

Referring to FIGS. 8 and 9, the handling mechanism 62 extends through the solid-state welding mechanism 61 below it. The handling mechanism 62 includes a first feeding seat 621, a transverse cylinder 622, a lifting cylinder 623, and a first lifting seat 624. The first feeding seat 621 is fixed to the chassis 15 and is provided with a first feeding groove 6211 for conveying the conductive plate 16, which extends in the first direction. The transverse cylinder 622 is installed below the first feeding groove 6211 on the first feeding seat 621. The transverse cylinder 622 is used to drive the lifting cylinder 623 to move in the first direction, and the lifting cylinder 623 is used to lift and lower the first lifting seat 624. The top of the first lifting seat 624 is fixed with two first pins 625. Correspondingly, there are two sockets 163 provided on both sides of each through slot 161 of the conductive plate 16, and the distance between the two sockets 163 is equal to the distance between the two first pins 625 on the first lifting seat 624, ensuring that the pins can be accurately inserted into the sockets 163 of the conductive plate 16.

The solid-state welding device 6 further includes a pressing mechanism 63, which includes a pressing cylinder 631 and a pressing plate 632. The pressing cylinder 631 is arranged on the first feeding seat 621, and the piston rod of the pressing cylinder 631 is fixedly connected to the pressing plate 632. Two first positioning pins 633 for positioning the conductive plate 16 are fixedly arranged on the pressing plate 632.

Figure 10:
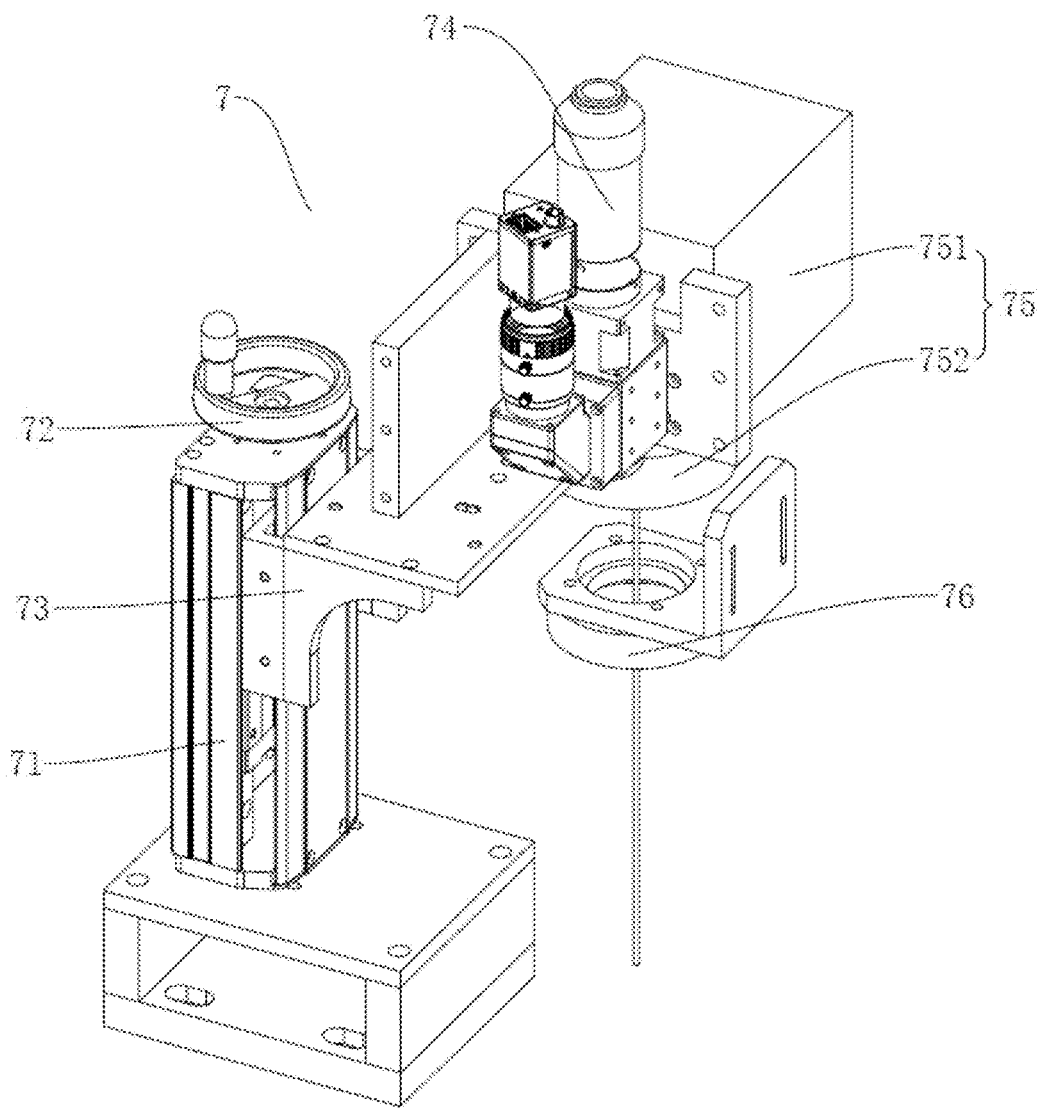
FIG. 10 is a schematic diagram of a laser welding device of the present application.

Referring to FIG. 10, the laser welding device 7 includes a first mounting base 71, a first lifting drive mechanism 72, and a second lifting seat 73. The first mounting base 71 is fixed to the chassis 15, and the first lifting drive mechanism 72 is provided on the first mounting base 71 to lift and lower the second lifting seat 73. The second lifting seat 73 is provided with a visual detection mechanism 74 for detecting the position of the conductive plate 16 and a laser welding mechanism 75 for secondary welding of the conductive plate 16. The laser welding mechanism includes a galvanometer component 751, a field lens 752, and at least two sets of red light components. The red light component and the field lens are arranged on the same side of the galvanometer component 751. The field lens 752 is installed on the outer wall of the galvanometer component 751, and can be detachably connected to galvanometer component 751. At least two sets of red light components emit light that coincides with the focal length of the field lens 752. The galvanometer component 751 is mainly used for scanning and positioning the laser beam, while the field lens 752 mainly adjusts the laser focal length and controls the size of the laser beam.

Figure 11:
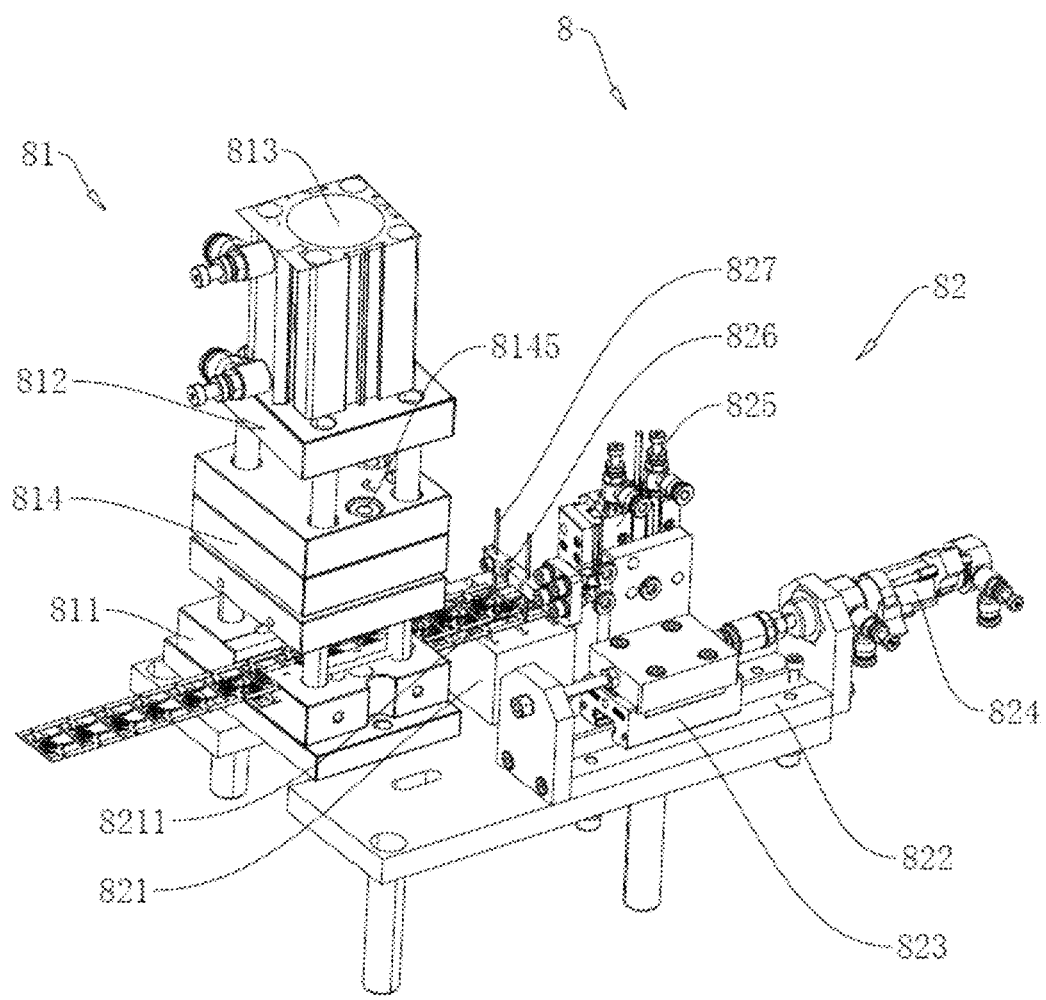
FIG. 11 is a schematic diagram of a pin cutting device of the present application.
Figure 12:
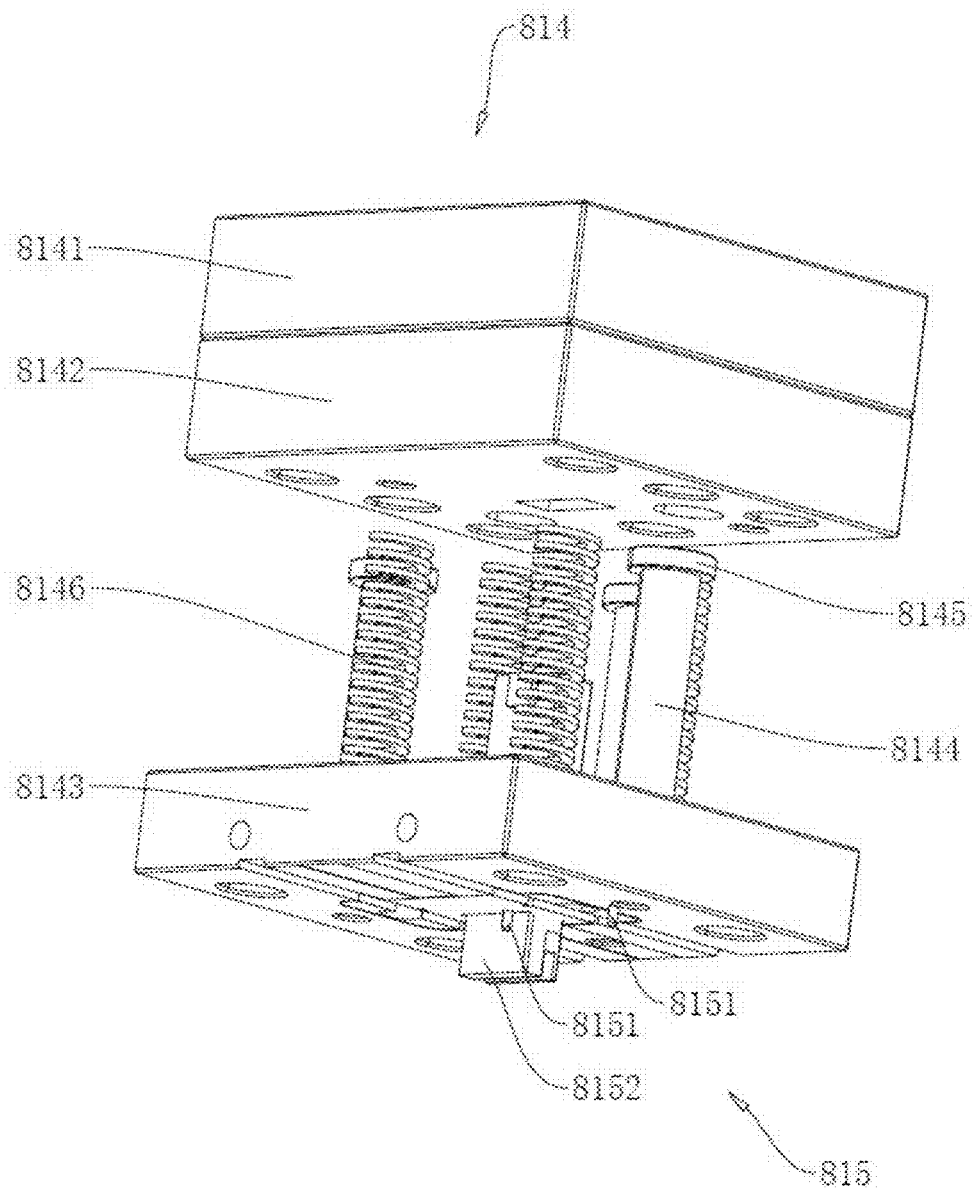
FIG. 12 is a schematic diagram of a first buffer lifting component of the present application.

Referring to FIG. 11, the pin cutting device 8 includes a first material receiving mechanism 82, which includes a second feeding seat 821 fixed to the chassis 15. The second feeding seat 821 is provided with a second feeding groove 8211 for transporting and welding inductance conductive plates.

The first material receiving mechanism 82 also includes a second mounting seat 822, a sliding component 823, a feeding cylinder 824, a lifting cylinder 825, and a fourth lifting seat 826. The second mounting seat 822 is fixed to the chassis 15, and the sliding component 823 slides and cooperates with the second mounting seat 822. The feeding cylinder 824 is installed on the second mounting seat 822, and is used to drive the sliding component 823 to slide in the first direction. The lifting cylinder 825 is installed on the sliding component 823, used to lift and lower the fourth lifting seat 826. The fourth lifting seat 826 is fixed with two second pins 827. The distance between the two sockets 163 is equal to the distance between the two second pins 827 on the third lifting seat 3112, ensuring that the pins can be inserted into the sockets 163 of the conductive plate 16.

The pin cutting device 8 further includes a pin cutting mechanism 81, which includes a second base 811, a third support seat 812, a third lifting component 813, a first buffer lifting component 814, and a pin cutting component 815. The second base 811 is installed on the chassis 15, and the third support seat 812 is connected to the second base 811 for supporting and positioning other components. The first buffer lifting component 814 is in sliding cooperation with the third support seat 812, and the third lifting component 813 is provided on the third support seat 812 to lift and lower the first buffer lifting component 814. The pin cutting component 815 is used to position the conductive plate 16 and to cut off the pins on the inductor coil.

The pin cutting component 815 includes a second positioning pin 8151 and a pin cutting knife 8152. The second positioning pin 8151 is provided on a first buffer lifting component 814. When the first buffer lifting component 814 descends, the second positioning pin 8151 will first contact the conductive plate 16, achieving precise positioning of the conductive plate 16. As the lifting action continues, the pin cutting knife 8152 will pass through the sliding hole of the third lifting block 8143 to contact with and cut off the pin on the inductor coil.

Figure 13:
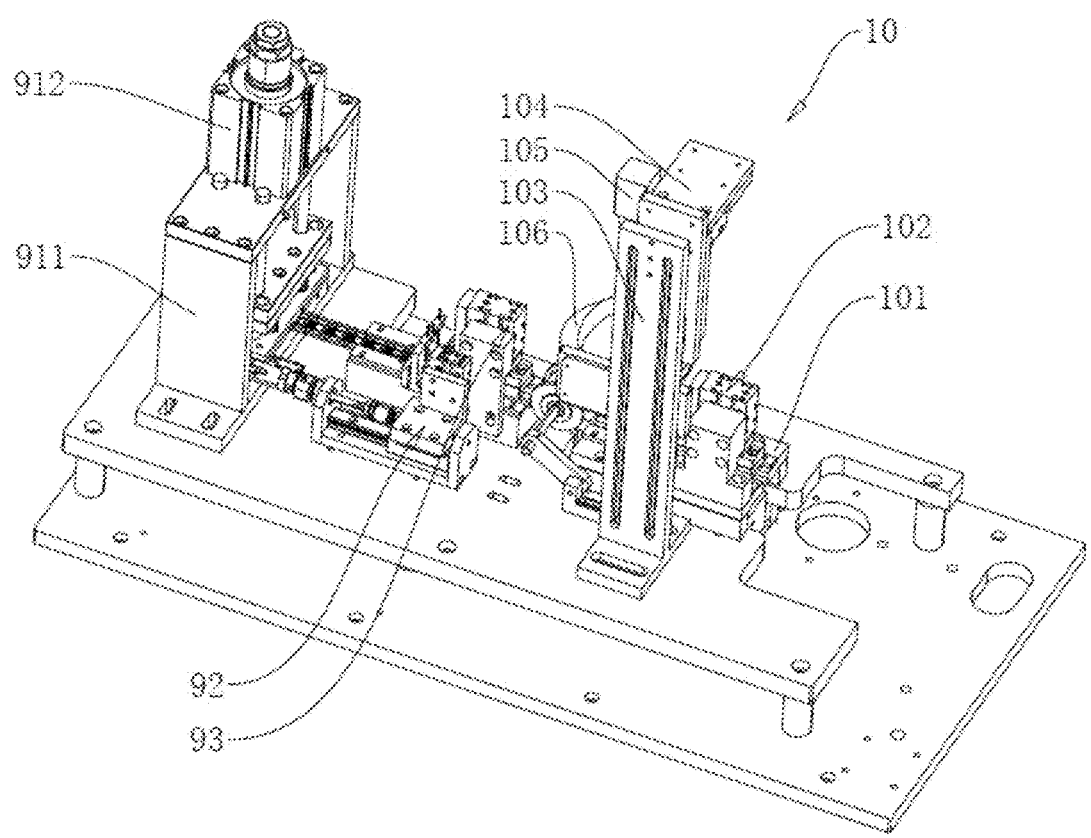
FIG. 13 is a schematic diagram of a detection device of the present application.
Figure 14:
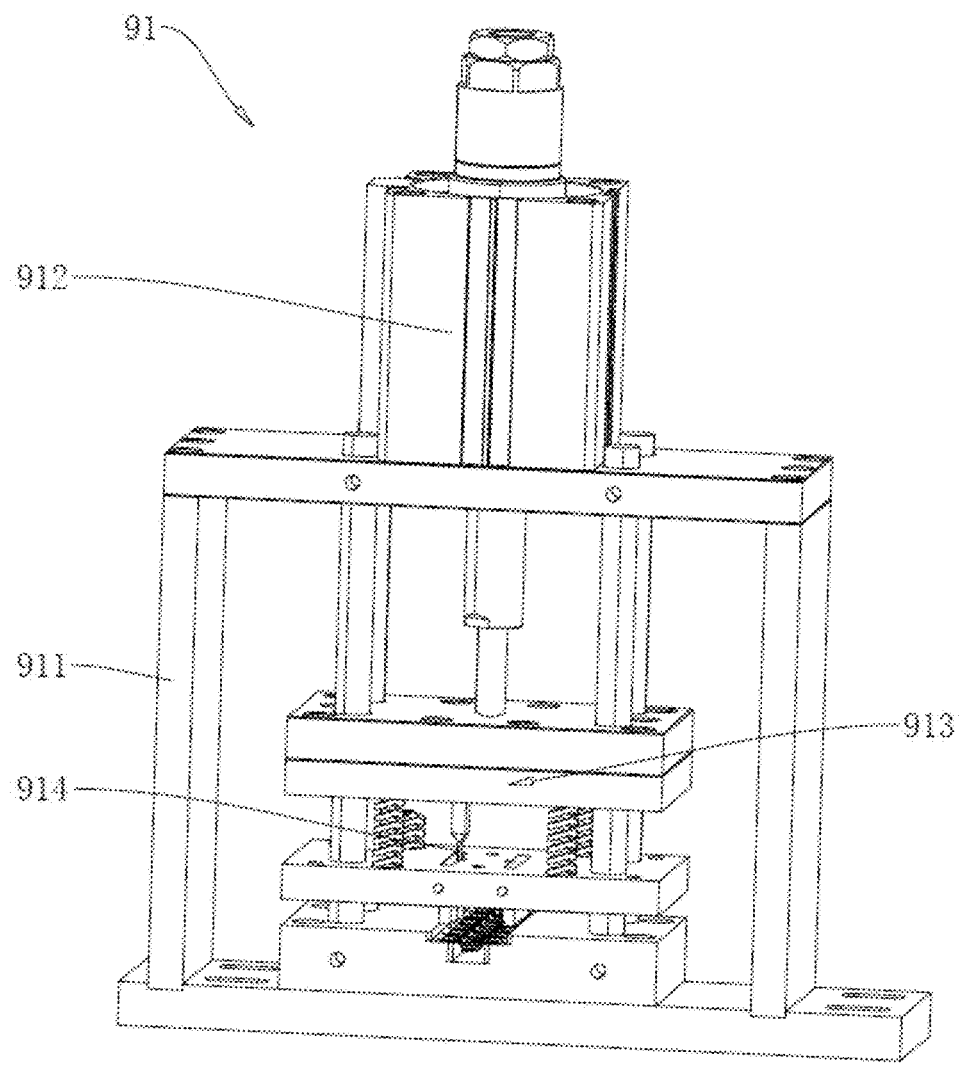
FIG. 14 is a schematic diagram of a marking mechanism of the present application.

Referring to FIG. 13, the detection device 10 includes a second material receiving mechanism 101, which operates on the same principle as the first material receiving mechanism 82. The detection device 10 also includes a first pressing mechanism 102, which is used to enhance the conveying stability of the conductive plates.

The detection device 10 further includes a fifth support seat 103, a lifting mechanism 104, a size detection mechanism 105, and a second light source mechanism 106. The fifth support seat 103 is fixed to the chassis 15, and the lifting mechanism 104 is provided on the fifth support seat 103. The lifting mechanism 104 is used to lift and lower the size detection mechanism 105 to adjust it to the optimal detection position.

The marking device 9 includes a third feeding mechanism 92, a second pressing mechanism 93, and a marking mechanism 91. The third feeding mechanism 92 is used to accurately transport the inductor coil products to be marked to the working area of the marking mechanism 91, and the second pressing mechanism 93 is used to increase the transportation stability of the conductive plates.

The marking mechanism 91 includes a sixth support seat 911, a sixth lifting component 912, a second buffer lifting component 913, and a marking needle 914. The sixth support seat 911 is installed on the third feeding mechanism 92 to ensure the stable operation of the entire marking mechanism 91. The sixth lifting component 912 is installed on the sixth support seat 911, used to lift and lower the second buffer lifting component 913, thereby lifting and lowering the marking needle 914.

Referring to FIG. 1, the winding device 14 is located at one end of the chassis 15 away from the conductive plate feeding device 4. The structure of the winding device 14 is symmetrical to that of the conductive plate feeding device 4.

Embodiment 2

This embodiment provides a welding process for an inductor coil, including:
- S1: unwinding a wire by the unwinding device 1;
- S2: performing stripping treatment to the wire by using the paint stripping device 2 to remove an insulation layer on the wire;
- S3: winding the stripped wire at a set distance by the winding device 3 into the shape of an inductor coil, and cutting the wire by the cutting mechanism 33, while further bending the pins of the inductor coil by the bending mechanism 34;
- S4: winding and transporting the conductive plate 16 by the conductive plate feeding device 4 to a predetermined position;
- S5: receiving and transferring the inductor coil by the material receiving device 5 to the solid-state welding station, and precisely transferring the inductor coil to a position below the conductive plate 16, wherein, at this time, the conductive plate 16 has been wound and transferred to the predetermined position by the conductive plate feeding device 4;
- S6: visually inspecting the position of the coil and ensure that the inductor coil is connected to a bottom of the conductive plate 16:
- S7: welding the two pins of the inductor coil by the solid-state welding device 6 onto the conductive plate 16 to form a welded inductance conductive plate;
- S8: performing secondary welding on the welded inductance conductive plate by the laser welding device 7 to enhance welding strength and reliability;
- S9: cutting off the excessive pins of the inductor coil with the pin cutting device 8, and transferring the welded inductance conductive plate to a visual inspection station;
- S10: detecting the size of the inductor coil by the detection device 10, wherein, if the size is determined to be OK, the method directly proceeds to the next step; and, if the size is judged as NG, the marking device 9 will mark the unqualified welding inductance conductive plates with dots;
- S11: when the size is judged as NG, drilling holes or make other markings on the welded inductance conductive plates marked with dots, facilitating subsequent differentiation and processing; and
- S12: winding the welded inductance conductive plates by the winding device 14.

The above are the preferred embodiments of the present application and do not limit the scope of protection of the present application. Therefore, any equivalent changes made according to the structure, shape, and principle of the present application should be included in the scope of protection of the present application.

LISTING OF REFERENCE SIGNS

1. Unwinding device
11. Unwinding mechanism
12. Wire arrangement mechanism
121. Tensioner
122. Wire arrangement device
2. Paint stripping device
21. Sliding mechanism
211. First support seat
212. Sliding seat
213. Screw rod
214. Handwheel
22. Paint stripping mechanism
23. Suction mechanism
3. Winding device
31. Upper mold mechanism
311. First lifting assembly
3111. First support
3112. Third lifting seat
3113. First lifting drive component
312. Rotation drivers
313. Spindle component
314. Core pulling drivers
315. Second clamping member
32. Lower mold mechanism
321. Second support
322. Buffer component
323. Second lifting component
324. Lower mold core
33. Cutting mechanism
331. Third cylinder
332. Cutting knife
34. Bending mechanism
341. Fourth cylinder
342. Bending block
35. Guidance mechanism
351. Horizontal driver
352. Fifth lifting component
353. Guidance component
4. Conductive plate feeding device
41. Support frame
42. Turntable
43. Rotation driving mechanism
5. Material receiving device
51. Transverse driving mechanism
52. Longitudinal drive mechanism
53. Second lifting drive mechanism
531. Fourth lifting component
532. Lifting frame
54. Material receiving mechanism
55. Pin pushing mechanism
6. Solid-state welding device
61. Solid-state welding mechanism
611. First base
612. Welding components
6121. Welding lifting member
6122. Second lifting drive component
6123. First clamping member
6124. Welding needle 62. Handling mechanism
621. First feeding seat
6211. First feeding trough
622. Transversal cylinder
623. Lift cylinder
624. First lifting seat
625. First pin
63. Material pressing mechanism
631. Pressing cylinder
632. Pressing plate
633. First positioning needle
7. Laser welding device
71. First installation seat
72. First lifting driving mechanism
73. Second lifting seat
74. Visual inspection mechanism
75. Laser welding mechanism
751. Galvanometer component
752. Field lens
76. First light source mechanism
8. Pin cutting device
81. Pin cutting mechanism
811. Second base
812. Third support seat
813. Third lifting component
814. First buffer lifting component
815. pin cutting component
8151. Second positioning needle
8152. Pin cutting knife
82. First material receiving mechanism
821. Second feeding seat
8211. Second feeding trough
822. Second mounting bracket
823. Sliding components
824. Feeding cylinder
825. Lifting cylinder
826. Fourth lifting seat
827. Second pin
9. Marking device
91. Marking mechanism
911. Sixth support seat
912. Sixth lifting component
913. Second buffer lifting component
914. Marking needle
92. Third material receiving mechanism
93. Second material pressing mechanism
10. Detection device
101. Second material receiving mechanism
102. First material pressing mechanism
103. Fifth support seat
104. Lifting mechanism
105. Size detection mechanism
106. Second light source mechanism
13. Positioning device
14. Winding device
15. Chassis
16. Conductive plate
161. Through slot
162. Connecting portion
163. Socket

What is claimed is:

1. An inductor coil welding equipment, comprising a feeding system, a solid-state welding device, and a laser welding device,
wherein the laser welding device is located behind the solid-state welding device, the feeding system is used to sequentially send an inductor coil and a conductive plate to the solid-state welding device and the laser welding device, the solid-state welding device is used to pre-weld and fix the inductor coil to the conductive plate, forming a welded inductance conductive plate, and the laser welding device is used for performing enhancement welding at a welding joint between the inductor coil and the conductive plate.

2. The inductance coil welding equipment according to claim 1, wherein the solid-state welding device comprises a solid-state welding mechanism, a handling mechanism, and a pressing mechanism, the handling mechanism is used to transport the conductive plate to the solid-state welding mechanism, the pressing mechanism is used to fix the conductive plate and the inductor coil during solid-state welding, and the solid-state welding mechanism is used to pre-weld and fix two pins of the inductor coil to corresponding positions on the conductive plate through resistance heating.

3. The inductance coil welding equipment according to claim 2, wherein the solid-state welding mechanism comprises a first base and multiple solid-state welding components, the multiple solid-state welding components comprise a welding lifting member, a second lifting driver, a first clamping member, and a welding needle, the welding lifting member is in sliding fit with the first base, the second lifting driver is provided on the first base for lifting and lowering the welding lifting member, the first clamping member is provided on the welding lifting member for clamping the welding needle, and the welding needle serves as a direct contact component during a welding process, used to weld the two pins of the inductor coil to the conductive plate.

4. The inductance coil welding equipment according to claim 3, wherein the handling mechanism comprises a first feeding seat, a transverse cylinder, a lifting cylinder, and a first lifting seat, the first feeding seat is fixed to a chassis, a first feeding groove for conveying the conductive plate is opened on the first feeding seat, the transverse cylinder is provided on the first feeding seat, the transverse cylinder is located below the first feeding groove, the transverse cylinder is used to drive the lifting cylinder to move in a first direction, the lifting cylinder is used to drive the first lifting seat to lift, and a top of the first lifting seat is fixed with two first pins.

5. The inductance coil welding equipment according to claim 4, wherein the pressing mechanism comprises a pressing cylinder and a pressing plate, the pressing cylinder is provided on the first feeding seat, the pressing cylinder is in cooperation with the pressing plate, and two first positioning pins for positioning the conductive plate are fixedly arranged on the pressing plate.

* * * * *